UNITED STATES PATENT OFFICE.

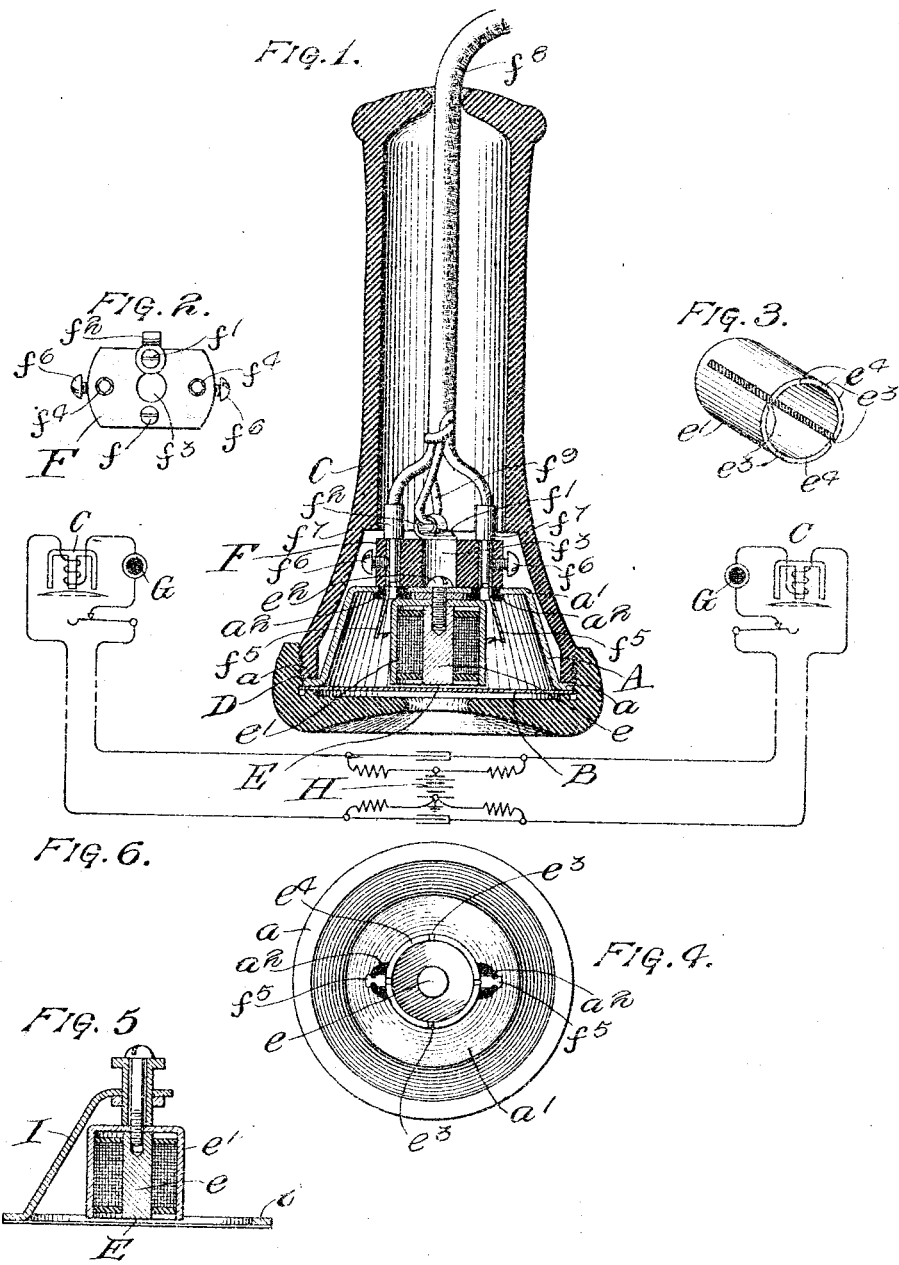

BERNARD D. WILLIS, OF CHICAGO, ILLINOIS, ASSIGNOR TO AUTOMATIC ELECTRIC COMPANY, OF CHICAGO. ILLINOIS, A CORPORATION OF ILLINOIS.

TELEPHONE-RECEIVER.

1,181,710.  Specification of Letters Patent.  Patented May 2, 1916.

Application filed March 1, 1910. Serial No. 546,617.

*To all whom it may concern:*

Be it known that I, BERNARD D. WILLIS, a citizen of the United States of America, and a resident of Chicago, Cook county, Illinois, have invented a certain new and useful Improvement in Telephone-Receivers, of which the following is a specification.

My invention relates to telephone receivers—that is to say, the instruments which are held to the ear to enable the listener to hear the voice or other vibrations transmitted from the other end of the circuit.

In the use of devices of this kind it has been the general practice to employ permanent magnets for polarizing the same, and to provide electromagnetic coils in conjunction therewith for influencing the diaphragm of the receiver. With receivers of this character it has also been the general practice to exclude the coils of the receiver from the path of battery current—that is to say, to so arranged the circuits that no battery current will flow through the coils which operate the diaphragm. It has also been proposed to include the receiver winding in the path of battery current, as is well known, but prior to my invention this method was not entirely satisfactory, and did not give the best results.

The object of my invention is, therefore, the provision of a commercially useful and highly efficient telephone receiver in which there is no permanent magnet, in which the coils for operating the diaphragm are connected directly in series with the transmitter, and in which the ratio of the coefficient of self-induction to the number of turns of wire is of a character to give the best results, thus utilizing the flow of battery current for attracting the diaphragm of the receiver and insuring as good results, from a practical and commercial standpoint, as would ordinarily be obtained by the use of a receiver having a permanent magnet.

To the foregoing and other useful ends my invention consists in matters hereinafter set forth and claimed.

In the accompanying drawings Figure 1 is a longitudinal section of a telephone receiver embodying the principles of my invention. Fig. 2 is a detail view of the mounting or connection-fitting by which the circuit conductors are connected with the coils of the receiver. Fig. 3 is an enlarged perspective view of the soft iron cup that forms one pole of the electromagnet. Fig. 4 is an end elevation or face view of the receiver, with the diaphragm thereof removed, showing the central and concentric arrangement of the electromagnet and poles thereof relative to the center of the end of the receiver. Fig. 5 is a detail sectional view illustrating a modified form of the construction shown in Fig. 1. Fig. 6 is a diagram of a telephone circuit, illustrating the manner in which my improved receiver may be connected in the line in series with the transmitter in a common battery system.

As thus illustrated and referring more particularly to Figs. 1 to 4, inclusive, it will be seen that my invention comprises a brass cup A having a flange or perimeter $a$ that forms a seat or marginal bearing for the diaphragm B, said cup being slightly flaring in form. The said flange $a$ is adapted to engage the circular end edge of the receiver casing C, and the diaphragm and cup are clamped in place thereon by means of the usual apertured cap D, which latter is adapted to screw upon the open end portion of the said casing, both the casing and cap being preferably made of rubber vulcanite. The said cup has its smaller end or bottom wall $a'$ provided with two apertures arranged preferably at opposite sides of the center thereof and provided with insulating bushings $a^2$, thus providing insulated apertures in the back or bottom of the cup. The electromagnet E has a cylindric core $e$ upon which is mounted the winding or coil of the magnet, and to the rear end of which is secured the bottom of a soft iron cup $e'$, which cup forms a shell for the coil or winding of the magnet. The electromagent thus formed is secured to the back or bottom of the brass cup A by means of a screw $e^2$, which latter extends through a central opening in the said brass cup, through a central opening in the soft iron cup $e'$ and then into a threaded opening or socket in the end of the core $e$, a small washer being preferably interposed between the backs or bottoms of the two cups. In this way the electromagnet is firmly clamped in place at the center of the brass cup A and centrally of the diaphragm of the receiver. I have discovered that in order to secure the highest efficiency the electromagnet E should be so proportioned that the coefficient of self-induction, expressed in henries, divided by the number of turns of wire should be not less than .000094 not greater than .00016. In other words, a certain relation or ratio of the coefficient of self-induction to the number of turns is necessary, as this, I find, gives better results than heretofore. The cup $e'$ is preferably formed with longitudinal slots $e^3$, which slots divide the cylindric sides of the cup into four portions which are separated at their outer ends but united at their other ends through the medium of the back or bottom of the cup. It will be seen that the semi-circular or segmental pole-pieces $e^4$ are arranged concentrically in a circle around the outer end of the core $e$, and that consequently both poles of the electromagnet are in juxtaposition to the back of the diaphragm, so that the magnetic circuit is closed through the latter when the magnet is energized by a flow of electrical current therein. One pole of the magnet is at the exact center of the diaphragm, and the other pole of the magnet acts on the diaphragm along the line of a circle extending concentrically around the other pole, whereby a centralized and uniform magnetic action is exerted upon the diaphragm.

To the back of the brass cup A there is secured a block of insulation or mounting F, the same being held in place by screws $f, f'$ inserted therethrough and into the back or bottom of the brass cup. A hook or hitching post $f^2$ is secured in place by the screw $f'$ upon the top or outer surface of the block F, and the latter is provided with a central opening $f^3$ that affords access to the screw $e^2$, whereby the electromagnet can be detached from the brass cup. Brass terminal pieces or binding posts $f^4$ are inserted through the block F and provided with projecting portions $f^5$ that extend through the bushings $a^2$ and into the interior of the brass cup, where they are then suitably connected with the terminals of the coil or winding of the electromagnet. These binding posts $f^4$ are provided with clamping screws $f^6$, and each post is adapted to receive one of the card terminals or plugs $f^7$ that form the terminals of the flexible cord $f^8$ extending rearwardly through the casing of the receiver, in the ordinary and well-known manner. The said cord has a loop or attaching portion $f^9$ that engages the hitching post $f^2$, whereby the weight of the receiver is not sustained by the terminal portions $f^7$, but instead by a special or separate connection with the cord.

Referring to Fig. 6 it will be seen that the receivers C are here shown diagrammatically and in series with the transmitters G in a common battery system. As shown, the current from the central battery H is supplied over the line circuit and passes to the transmitters and receivers at the substations, whereby as soon as the line circuit is closed the diaphragms of the receivers are placed under a stress or tension as a result of the energizing of the electromagnets of the said receivers. In this way no permanent magnets are necessary for the receivers, as both the battery and the voice currents traverse the coils or windings by which the diaphragms of the receivers are actuated.

In Fig. 5 the construction is substantially the same as that shown in Fig. 1 except that the electromagnet and its cup are adjustably secured to a brass arm I instead of to the bottom of the brass cup, said arm being integral with the brass ring $i$ which forms a seat or marginal bearing for the diaphragm.

The receiver thus constructed embodies a single electromagnet having a straight core, one pole of which is disposed at and just out of contact with the center of the diaphragm, and the other or remote pole of which is provided with a cup-shaped pole-piece disposed in position to act on the diaphragm along the line of a circle extending concentrically around the center thereof. Furthermore, this circular pole of the magnet is broken up into segments or sections which are preferably equal in length. I find that this construction of cup gives the best results, although, obviously, for the broader purposes of my invention the magnet may have its rear end provided with a pole-piece of any suitable form or character.

A receiver of this kind, in which the ratio of the number of turns of wire to the coefficient of self-induction is of the character set forth, is efficient and reliable in use.

What I claim as my invention is:—

1. In a telephone system, a receiver comprising a diaphragm, and an electromagnet having a coil or winding thereon for operating the diaphragm, the coefficient of self-induction of said electromagnet divided by the number of turns thereof being between .000094 and .00016.

2. A telephone exchange system receiver comprising a diaphragm, an electromagnet therefor having a pole-piece in operative relation to said diaphragm, and a coil through which voice-currents are transmitted to cause said pole-piece to vibrate the diaphragm, the coefficient of self-induction of said electromagnet expressed in henries divided by the number of turns thereof being between .000094 and .00016, as set forth.

3. A telephone receiver embodying a diaphragm and a normally neutral electromagnet adapted to be initially polarized by the currents in the line, said electromagnet having a coil or winding thereon for operating the diaphragm, the co-efficient of self induction of said electro-magnet divided by the number of turns thereof being between .000094 and .00015.

Signed by me at Chicago, Cook county, Illinois, this 11th day of Feb., 1910.

BERNARD D. WILLIS.

Witnesses:
EDWARD D. FALES,
ARTHUR J. RAY.